United States Patent

[11] 3,622,057

[72] Inventor Hannes Marker
Hauptstrasse 51-53, Garmisch-
Partenkirchen, Germany
[21] Appl. No. 814,108
[22] Filed Apr. 7, 1969
[45] Patented Nov. 23, 1971
[32] Priority Apr. 19, 1968
[33] Germany
[31] P 17 55 273.7

[54] LOCKABLE SKI CARRIER FOR MOTOR VEHICLES
14 Claims, 9 Drawing Figs.
[52] U.S. Cl. .................................................. 224/42.1 F
[51] Int. Cl. ........................................................ B60r 9/04
[50] Field of Search ............................................. 224/42.1 A,
42.1 D, 42.1 F, 42.1 G, 42.1 E

[56] References Cited
UNITED STATES PATENTS
3,132,780 5/1964 Binding .................... 224/42.1 F
3,468,460 9/1969 Wright et al. ................. 224/42.1 E FOREIGN PATENTS
303,500 2/1955 Switzerland ................. 224/42.1 E
307,227 7/1955 Switzerland ................. 224/42.1 E Primary Examiner—Gerald M. Forlenza
Assistant Examiner—Lawrence J. Oresky
Attorney—Fleit, Gipple & Jacobson ABSTRACT: A carrying frame supported in the gutters of the roof of a vehicle and provided with clamps, which can be locked in a clamping position and serve to hold at least two pairs of skis. A crossmember of the carrying frame is rotatably and axially nondisplaceably mounted in the legs of the carrying frame. The clamps are secured to the crossmember of the carrying frame. The crossmember of the carrying frame is adapted to be locked against rotation by means of a combination lock, thereby preventing the release of the ski clamps and the unauthorized removal of the skis.

INVENTOR
HANNES MARKER

BY Fleit, Gipple & Jacobson
ATTORNEYS

LOCKABLE SKI CARRIER FOR MOTOR VEHICLES

The present invention relates to lockable ski carriers for motor vehicles, which ski carriers comprise a carrying frame, which is supported for example in the gutters of the roof of the vehicle and provided with clamps which can be locked in clamping position and are adapted to hold several pairs of skis each.

Normally when such ski carriers are intended to hold four pairs of skis, they comprise at least two clamps. This is undesirable because a lock is required for each clamp so that the ski carrier is highly expensive. Another disadvantage resides in that the operation is complicated because various manipulations must be repeated.

For this reason, it is an object of the present invention to avoid in a simple manner, the disadvantages of the known ski carriers.

In a lockable ski carrier for motor vehicles, which ski carrier comprises a carrying frame supported for example in the gutters of the roof of a vehicle and provided with clamps, which can be locked in clamping position and serve to hold several pairs of skis the object is accomplished according to the invention in that the crossmember of the carrying frame is rotatably and axially nondisplaceably mounted in the legs of the carrying frame. The clamps are secured to the crossmember of the carrying frame, and an actuating and locking device is provided for the crossmember of the carrying frame and can be locked by a lock.

The ski carrier may be designed to hold four or more pairs of skis and all its clamps can be opened and closed by a single manipulation. In addition, there is only a single lock which must be operated before the U-shaped clamps are opened and after they have been closed.

It has proved desirable to provide the actuating and locking device with a handle level, which is nonrotatable and axially movable relative to the crossmember of the carrying frame. If the skis are to be selectively clamped individually or in pairs, it will be desirable to use a development of the invention, in which the lever is adapted to be locked in different angular positions relative to the crossmember of the carrying frame.

In a further development of the invention, one part of the lock may be carried by the lever of the actuating and locking device and the other part may be carried by the leg of the carrying frame.

To prevent an undesired loosening of the fixing screw which secures the carrying frame to the roof of the vehicle and which is provided at the free end of the leg of the carrying frame, the free end of the lever may constitute a cover cap which engages the screwhead when the lever is in the locking position. In this case, a locking lever is provided at that end of the crossmember of the carrying frame remote from the handle lever wherein the locking lever has a suitable cover cap engaging the fixing screw which is provided on this side of the carrying frame when the locking lever is in the locking position.

The crossmember of the carrying frame is telescopic so that the ski carrier can be used with motor vehicles having different widths.

To hold the skis securely in position during transit and to avoid damage to the surfaces of the skis, the clamping portions of the crossmember of the carrying frame and/or the clamping portions of the clamps may carry a resilient covering for example rubber or foamed plastics material on the like.

The clamps may be T-shaped or may have the shape of an inverted L. To prevent the skis from being pulled out laterally where clamps of such shapes are used, the free ends of the flanges are angled. In a development of this aspect of the invention, the clamps may have the form of an inverted U. In this case, the two free leg ends of the U adjoin the crossmember of the carrying frame so that a closed frame results and the skis cannot be pulled out laterally.

Embodiments of the invention will now be described more fully and by way of example with reference to the accompanying drawings.

Figure 1:
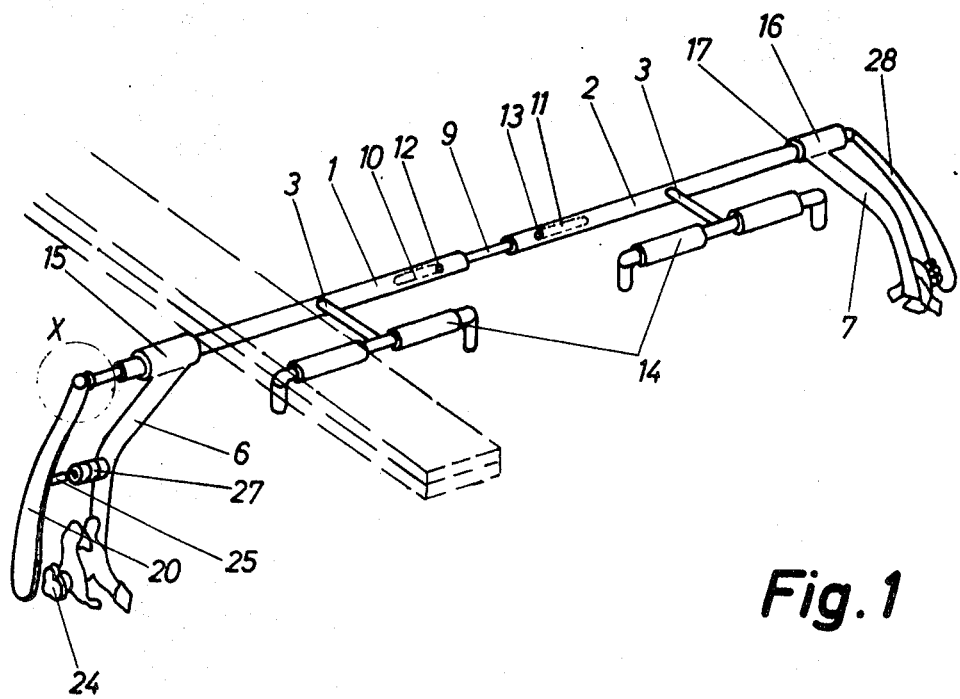
FIG. 1 is a perspective view showing a lockable ski carrier according to a first embodiment is closed but unlocked condition.
Figure 3:
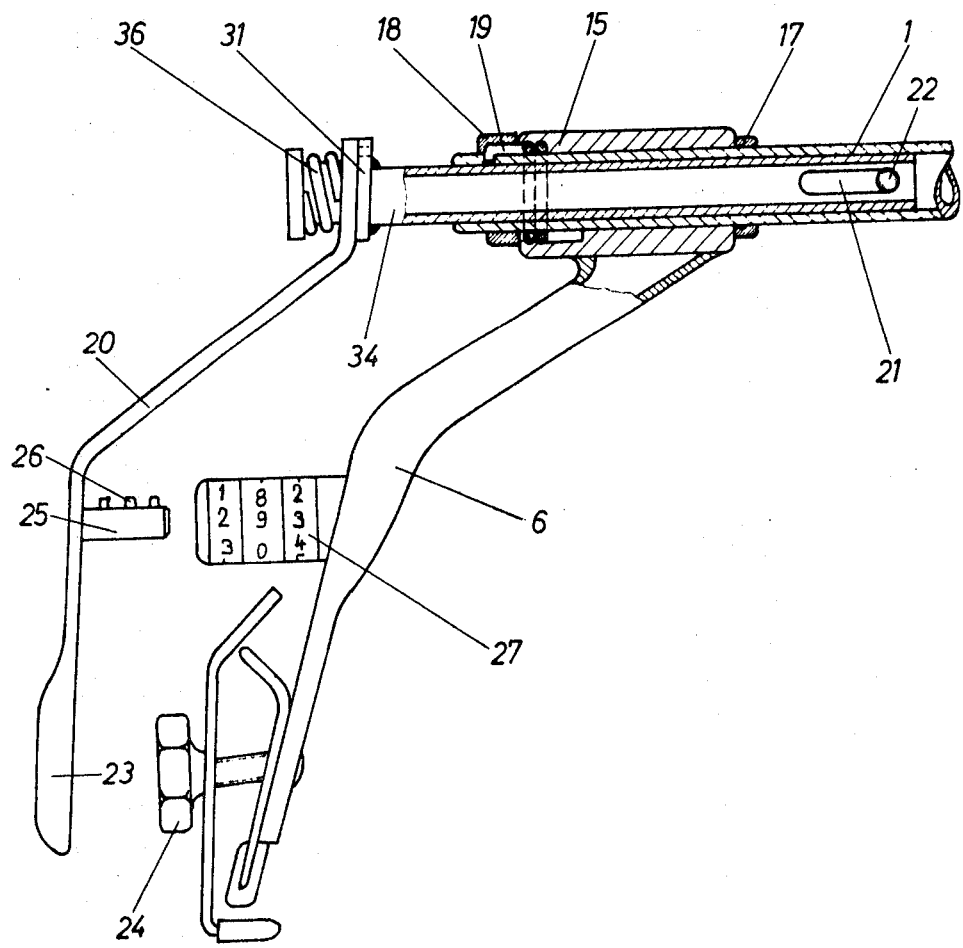
FIG. 3 is a side elevation showing, on a larger scale than FIG. 1, that end of the ski carrier, partly cut open, which is provided with the locking lever carrying the combination lock.
Figure 4:
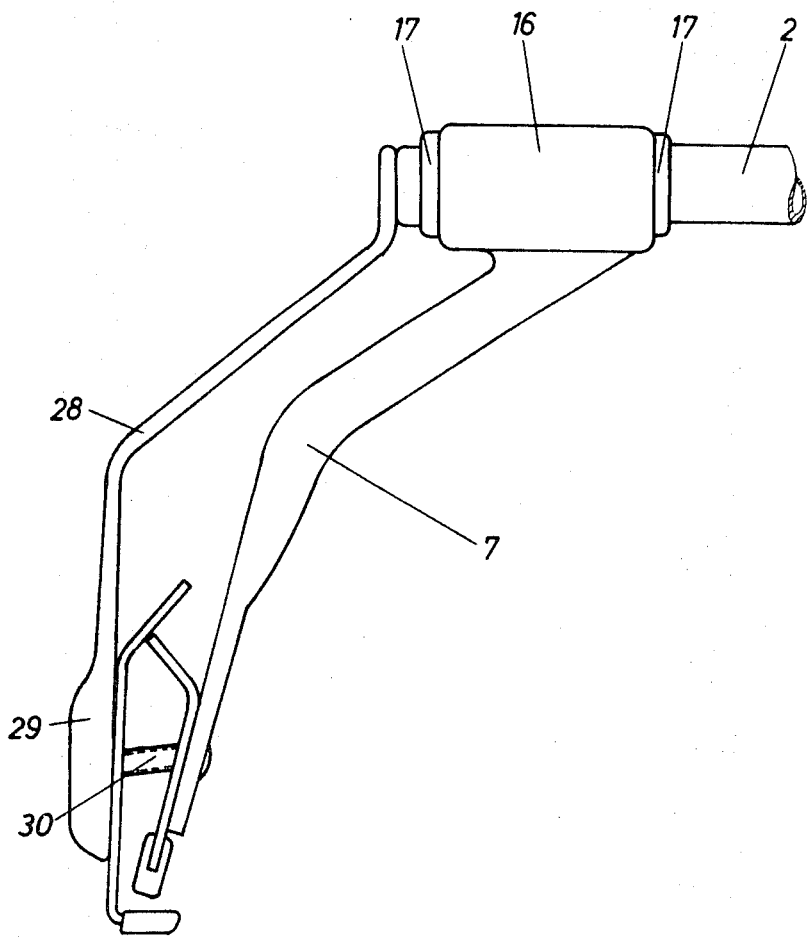
FIG. 4 is a side elevation on the same scale as FIG. 3 and shows the other end of the ski carrier.

As is apparent from FIG. 1, the carrying frame of the ski carrier has substantially the shape of an inverted U. In a manner which is known and for this reason will not be described more fully, the carrying frame is supported at the free ends of its legs 6 and 7 in the gutters of a vehicle roof 8, which is indicated only in FIG. 2. The crossmember of the carrying frame consists of two tubes 1 and 2, which are interconnected by a connector 9. The free end of the tube 1 is freely rotatably mounted in a bearing block 15 formed by the leg 6 (see particularly FIG. 3). The free end of the tube 2 is freely rotatably mounted in a bearing block 16 formed by the leg 7 (see particularly FIG. 4). Rings 17 and 18 are secured to the tubes 1 and 2 on both sides of the baring blocks 15 and 16 to prevent a longitudinal displacement of the tubes. As is apparent from FIG. 1, the connector 9 has slots 10 and 11 at respective ends which protrude into the tubes 1 and 2. The tube 1 is provided with a pin 12, which is riveted to the tube at both ends and extends through the slot 10. The tube 2 is provided with a corresponding pin 13, which extends through the slot 11. This enables the use of the ski carrier on motor vehicles differing in width. The telescopic design of the crossmember of the carrying frame enables an adjustment without need for a tool and without need for a loosening and retightening of set screws.

A clamp 3 is secured to each tube 1 and 2. In the embodiment shown in FIGS. 1 and 2, these clamps have the form of a "T," with the head of the "T" being substantially U-shaped and the stem of the "T" secured to a tube. Each clamp 3 can hold two pairs of skis. The free flange ends of the clamps are angled and when the clamp is in the position shown in FIGS. 1 and 2 these flange ends extend downwardly to such an extent that they prevent a lateral pulling of the skis from the carrier.

Figure 2:
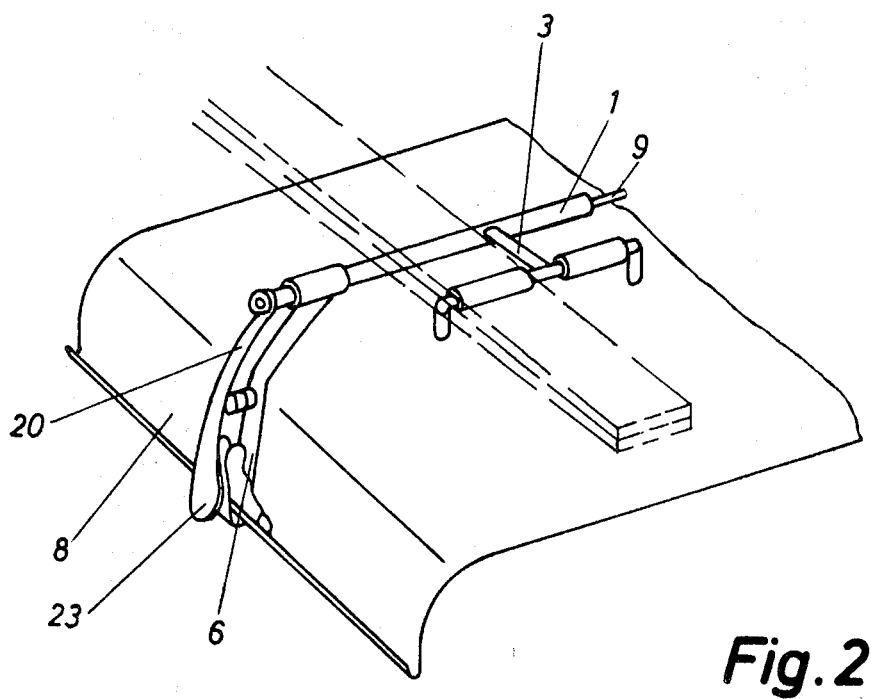
FIG. 2 is a view similar to FIG. 1 and shows the forward half of the ski carrier in locked condition.

FIGS. 1 and 2 show the clamps in clamping position, in which they force the skis against the crossmember of the carrying frame. When it is desired to remove the skis, the crossmember must be rotated to disengage the clamps from the skis. This rotation is effected by means of a handle lever 20, which is carried by a hollow shaft 34 (see particularly FIG. 3). The hollow shaft 34 is inserted into the free end of the tube 1 and is nonrotatably mounted therein for a limited longitudinal displacement. For this purpose, the hollow shaft comprises a slot 21, through which extends a pin 22, which is riveted in the tube 1. The lever 20 comprises a pin 25, which is parallel to the shaft 34 and carries noses 26 and forms a part of a combination lock. The part 27 of the lock is carried by the leg 6 of the carrying frame. When the clamps 3 are in clamping position, the pin 25 is in register with the axial recess in the part 27. In this position, the lever 20 can be displaced to the right in FIG. 3 so that the two parts of he combination lock interengage. The several digit rings can then be rotated to lock the lever so that it cannot be rotated to release the skis from the clamp 3.

The free end of the lever 20 consists of a cover cap 23, which serves to cover a fixing screw 24 when the lever is in locking position. The fixing screw 24 serves to detachably hold the leg 6 of the carrying frame in the gutter of the vehicle roof. The carrying frame is thus locked on one side against being removed from the vehicle roof by an unauthorized person. The carrying frame is locked on the other side in that the fixing screw 30 is covered by a cover cap 29 (see particularly FIG. 4), which is provided at the free end of a lever 28. The lever 28 is firmly connected to the free end of the tube 2 and is pivotally moved as said tube is rotated.

The hollow shaft 34 carries a ring 31 (see particularly FIGS. 5 and 6), which may be secured, by welding. A flange is carried by the hollow shaft at that end thereof which protrudes from the tube 1. The lever 20 is mounted on that part of the hollow shaft which lies between the flange and the ring and is urged against the ring 31 by a spring 36, which is mounted on the hollow shaft and bears on the flange thereof. The lever 20 is locked against rotation on the hollow shaft 34 by a pin 35 carried by the lever (see FIG. 6), which selectively enters one of two bores 32 and 33 in the ring 31 (see particularly FIG. 7). This enables the clamps 3 to assume two angular positions in a locked condition. This design enables the use of the clamps to hold the skis individually or in pairs. The crossmember of the carrying frame is rotated to its clamping position against the force of a spring arm 19 (see FIG. 3), which is mounted on the tube 1 between the ring 18 and the bearing block 15. The arm 19 holds the clamps open when the hollow shaft 34 has been pulled out of the tube 1.

Figure 5:
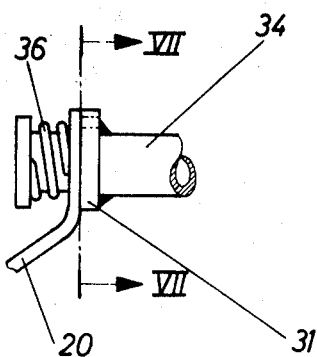
FIG. 5 is an enlarged side elevation showing the detail of FIG. 1.
Figure 6:
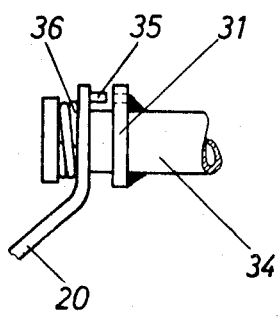
FIG. 6 shows the same detail as FIG. 5 in unlocked condition.
Figure 7:
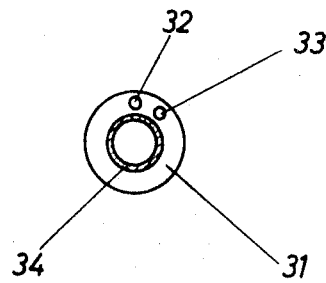
FIG. 7 is a sectional view taken on line VII—VII of FIG. 5.

The manipulation of the ski carrier which has been described is very simple. The ski carrier is first moved to its open position in that the lock is opened and the hollow shaft 34 is pulled out as shown in FIG. 6. The clamps will then be automatically swung upwardly by the spring arm 19. The skis are thereafter placed onto the crossmember of the carrying frame adjacent to the clamps. By a pivotal movement of the lever 20, the clamps are subsequently moved to their clamping position. The hollow shaft 34 is subsequently pushed into the tube 1 as shown in FIG. 5 so that the two parts of the combination lock are reengaged at the same time. The digit rings of the lock 27 are rotated as mentioned above to lock the lever 20 against being pulled out. The skis can now no longer be removed from the vehicle roof individually or together with the ski carrier without a destruction of the ski carrier and/or the gutters of the roof. For an authorized removal of the skis, the lock is opened and the operations previously described are performed in the reverse order.

Figure 8:
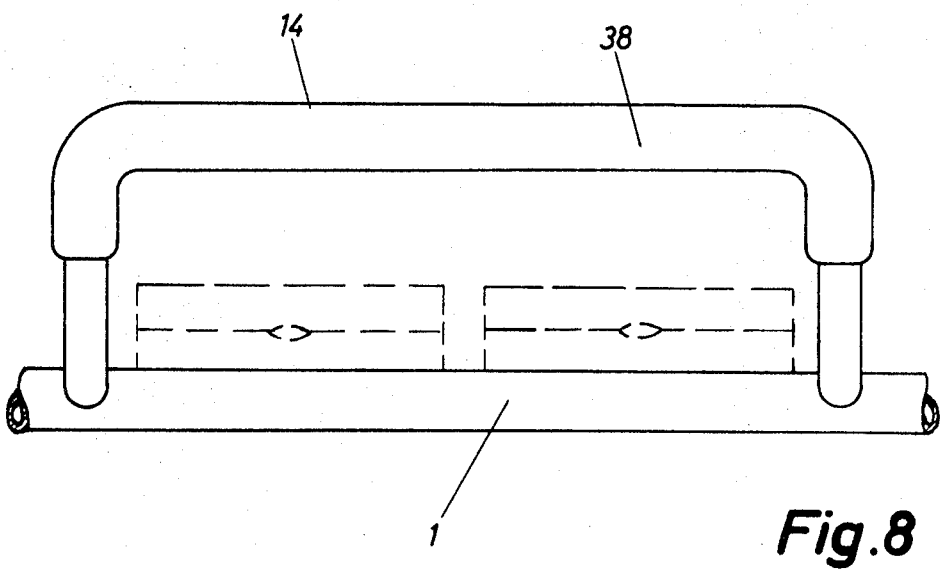
FIG. 8 shows a modification of the clamp shown in FIGS. 1 and 2.

FIG. 8 shows a clamp 38, which has the shape of an inverted U and has free leg ends secured to the tube -. A closed frame is thus obtained so that the skis, indicated in dotted lines, cannot be pulled out laterally.

Figure 9:
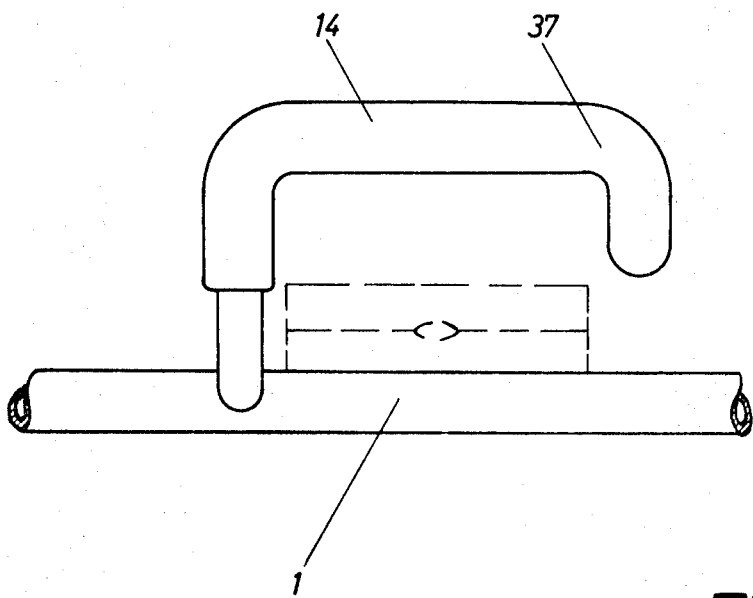
FIG. 9 shows another simple design of a clamp.

FIG. 9 shows a clamp 37 in the form of an inverted L. This clamp serves to clamp one pair of skis. It is obvious that its free arm can be increased in length so that two or three pairs of skis can be clamped.

The clamps 3, 38 and 37 each have a resilient cover 14, which may comprise, for example, rubber or foamed plastics material and serve particularly to locate the skis in transit by compensating for differences between the thicknesses of different skis.

What is claimed is:

1. A lockable ski carrier for automotive vehicles for holding at least two pairs of skis, the carrier comprising a substantially U-shaped carrying frame which rests in the rain gutters of the car roof, said carrying frame having clamps secured thereto which are lockable in a clamping position, a crossmember forming the bight of said carrying frame and mounted in a rotatable but axially nondisplaceable fashion in the legs of the carrying frame, the cross member having a clamping position and an open position, said clamps being arranged fixed on the crossmember for urging the skis against the crossmember when said crossmember is rotated into its clamping position, thereby securing the skis on the car carrying frame, and for relieving the force applied to the skis when said crossmember is rotated into its open position, thereby allowing insertion or removal of the skis from the ski carrier, each of said clamps comprising a clamping arm extending substantially parallel to said crossmember with at least one holding rod substantially perpendicular both to said clamping arm and said crossmember connecting the clamping arm to the crossmember, actuating means connected to said cross member of rotating said crossmember into its clamping position and into its open position, and locking means associating with said crossmember for locking said crossmember against rotation when in its clamping position.

2. A ski carrier according to claim 1, wherein a lever serves as a handle for the actuating means, said actuating means being nonrotatable but axially movable with respect to said crossmember.

3. A ski carrier according to claim 2, wherein said lever and a part of the locking means cooperate by means of a driving pin so that the lever can be inserted into a selected borehole in the locking means.

4. A ski carrier according to claim 2, wherein one part of the locking means is provided on the lever and the other part on the arm of the carrying frame.

5. A ski carrier according to claim 2, in which the arms of the carrying frame are each provided with a car roof fastening device, with the free end of the lever being developed as a covering cap for the corresponding fastening device.

6. A ski carrier according to claim 5, wherein a locking lever for locking the corresponding fastening device is provided on the end of the web of the carrying frame which does not have the lever which serves as a handle.

7. A ski carrier according to claim 1, wherein the crossmember is telescopic.

8. A ski carrier according to claim 1, wherein the clamps of the crossmember have an elastic covering.

9. A ski carrier according to claim 8, wherein the clamping arm of each clamp has an elastic covering.

10. A ski carrier according to claim 1, wherein the clamps are substantially T-shaped 11. A ski carrier according to claim 10, wherein the clamp has a clamping arm bent at an angle.

12. A ski carrier according to claim 1, wherein the clamping arm is developed as an inverted "L."

13. A ski carrier according to claim 12, wherein the free end of the clamping arm is bent at an angle.

14. A ski carrier according to claim 1, wherein the clamping arm has the shape of an inverted "U."

* * * * *